US006560849B1

(12) United States Patent
Modra

(10) Patent No.: US 6,560,849 B1
(45) Date of Patent: May 13, 2003

(54) APPARATUS FOR MANUFACTURING SLATS

(76) Inventor: Christopher Max Modra, 277 Springwood Road, Springwood, Queensland (AU), 4127

( * ) Notice: Subject to any disclaimer, the term of this patent is extended or adjusted under 35 U.S.C. 154(b) by 0 days.

(21) Appl. No.: 09/673,362

(22) PCT Filed: Apr. 15, 1999

(86) PCT No.: PCT/AU99/00280

§ 371 (c)(1), (2), (4) Date: Oct. 16, 2000

(87) PCT Pub. No.: WO99/53167

PCT Pub. Date: Oct. 21, 1999

(30) Foreign Application Priority Data

Apr. 15, 1998 (AU) .......................................... PP003016

(51) Int. Cl.[7] ................................................ B23P 23/00

(52) U.S. Cl. ....................... 29/564.8; 29/33 Q; 29/24.5; 144/5; 83/363; 83/76.8; 83/80; 83/620; 83/687; 83/365; 83/369

(58) Field of Search .............................. 144/5; 29/24.5, 29/33 R, 33 S, 33 Q, 564.7, 564.8; 83/361, 363, 76.8, 54, 80, 620, 687, 369, 365, 367, 549, 835

(56) References Cited

U.S. PATENT DOCUMENTS

| | | | | | |
|---|---|---|---|---|---|
| 4,721 | A | * | 8/1846 | Woodworth, III | 144/5 |
| 1,482,350 | A | * | 1/1924 | Dayton | 83/109 |
| 2,569,197 | A | * | 9/1951 | Royer | 83/159 |
| 2,970,372 | A | * | 2/1961 | Berman | 29/33 Q |
| 3,237,495 | A | * | 3/1966 | Creamer | 83/76.4 |
| 3,498,167 | A | * | 3/1970 | Hill | 83/76.6 |
| 3,602,378 | A | * | 8/1971 | Thompson | 221/270 |
| 3,830,129 | A | * | 8/1974 | Valente | 83/552 |
| 4,255,993 | A | * | 3/1981 | Stubbings | 83/76.8 |
| 4,430,916 | A | | 2/1984 | Edixhoven | |
| 4,436,007 | A | * | 3/1984 | Russon et al. | 83/76.7 |
| 4,538,330 | A | * | 9/1985 | Edixhoven | 29/24.5 |
| 4,639,987 | A | | 2/1987 | Georgopoulos | |
| 4,730,372 | A | * | 3/1988 | Tsuchida | 29/24.5 |
| 4,823,449 | A | * | 4/1989 | Chang | 29/24.5 |
| 4,907,325 | A | * | 3/1990 | Hsu | 144/5 |
| 5,022,296 | A | * | 6/1991 | Eschauzier et al. | 83/247 |
| 5,065,654 | A | * | 11/1991 | Cowan et al. | 83/255 |
| 5,323,879 | A | * | 6/1994 | Poulin | 188/19 |
| 5,349,730 | A | * | 9/1994 | Anderson et al. | 29/24.5 |
| 5,657,529 | A | * | 8/1997 | Bohn et al. | 29/33 Q |
| 5,669,128 | A | * | 9/1997 | Futamura et al. | 29/33 S |
| 5,826,317 | A | * | 10/1998 | van Oostrom et al. | 29/24.5 |
| 6,295,906 | B1 | * | 10/2001 | Kiger | 83/365 |

FOREIGN PATENT DOCUMENTS

| | | |
|---|---|---|
| AU | 52121/96 | 11/1996 |
| DE | 3122871 A1 | 3/1982 |
| EP | 0 099 678 A2 | 2/1984 |

* cited by examiner

*Primary Examiner*—A. L. Wellington
*Assistant Examiner*—Erica E Cadugan
(74) *Attorney, Agent, or Firm*—Young & Thompson

(57) ABSTRACT

An apparatus (10) is provided for automatically cutting strip materials (22) into slats (20) for a venetian blind. The apparatus (10) has a feeding station (12), a cutting station (14), a punching station (16) and a laddering station (18). Strip materials (22) for the slats (20) are stored in a magazine (24) of the station (12) and they are fed one at a time to the cutting station (14) for cutting into slats (20) of preset length after slots (46) have been punched. The slats (20) are then fed to the laddering station (18) for assembling into blinds. A sensor (56,58) is positioned to sense remnants of the strip material (22) and the remnants are automatically moved back to the feeding station (12) where they are lifted off the feeding path for ejection by a following strip (12).

17 Claims, 8 Drawing Sheets

APPARATUS FOR MANUFACTURING SLATS

TECHNICAL FIELD OF THE INVENTION

THIS INVENTION relates to an apparatus for manufacturing slats and in particular but not limited to an apparatus for manufacturing venetian blinds automatically.

BACKGROUND OF THE INVENTION

Prior apparatuses for manufacturing slats for venetian blinds involve two discrete stages. One stage is for cutting slats to length and then the cut slates are manually positioned in the other stage for punching slots in each said cut slats and laddering the punched slats.

Both stages of the prior art require proper setting for slats of particular blinds. In general the cutting stage requires setting a cutter to a position for cutting the slats to a desired length and the punching operation requires fixing punches for punching desired slot shape and setting the punches for punching in desired positions in the slats. As up to five punches may be involved in the punching operation the time for setting are relatively long.

The existing apparatuses are not flexible as they can only be used to manufacture slats selected from two different widths.

As two stages are involved, storage of cut or punched slats is required depending on whether the cutting or punching operation is carried out first.

These apparatuses cannot be fully automated as the cutting stage requires manual positioning of strip materials for cutting.

The existing apparatuses are therefore highly labour intensive and the slats are costly to manufacture. For timber slats, the existing apparatuses do not give a clean cut and chippings occur at ends of the cut slats.

OBJECT OF THE INVENTION

An object of the present invention is to alleviate or to reduce to a certain degree one or more of the prior art disadvantages.

SUMMARY OF THE INVENTION

In one aspect therefor the present invention resides in an apparatus for manufacturing slats. The apparatus comprises a strip material feeding station and a cutting station positioned downstream of the feeding station. The feeding station is adapted to feed a strip material into the cutting station for cutting into one or more slats of a preset length, and includes means for ejecting the strip material when the length of the strip material or remnant of the cut strip material is shorter than said preset length.

The ejection means may be arranged to eject the strip material or the remnant at the feeding station or downstream thereof.

Preferably the feeding station includes a receiving section for receiving the strip material to be cut and controllable drive means arranged for feeding the strip material into the cutting station. More preferably the drive means is positioned adjacent to the cutting station.

Desirably the drive means is reversible and the strip material for ejection or the remnant is driven back to the receiving section for ejection.

Preferably the apparatus has a collection section for collecting any of the ejected strip material and the remnants.

The feeding station may also include a magazine section in which a plurality of strip materials are stored and an inserting means for inserting one of the strip materials in the magazine section.

The magazine section desirably includes a guide arrangement for guiding the strip materials in said magazine section. Advantageously the guide arrangement is adjustable for different width of the strip material.

The ejection means may include a sensing device arrange to produce an ejection signal when the strip material or remnant is shorter than the preset length. Typically said sensing means is an optical detector arranged so that it receives an optical signal when the strip material or the remnant is shorter than said preset length.

Preferably the cutting stations include a cutting device positioned in close proximity to the feeding station and in particular to the drive means. This positioning allows a maximum number of slats to be cut from the strip material and remnant size is reduced to a minium.

In preference a vibration damping arrangement is provided for reducing chippings when cutting.

Desirably the cutting device has a saw blade and an anvil for the blade, and the damping arrangement includes employing a vibration damping material for certain parts close to the saw blade and contactable with the strip material during cutting. Said parts typically include a support for supporting the strip material, a clamp for clamping the strip material and the anvil.

The apparatus may have a punching station arranged downstream of the cutting station. The punching station includes a punch head having at least one punch controllably movable for punching apertures in the strip material.

The punch head preferably having a plurality of different punches selectable for a punching operation.

Typically the punch head has an elongate punch fixing member to which the punches are spacedly fixed and the fixing member is movable to select one of the punches for the punching operation.

The punching station is advantageously provided with a punch selection arrangement having a movable selection member with markings indicating positions for the punches and the selection member is connected to the punch head so that a punch can be selected by simply moving the selection member to the corresponding marking.

The apparatus may have a shaping station positioned between the cutting station and the punching station. The shaping station includes a shaping device arranged for shaping cut ends of the strip material.

The shaping device can be arranged to shape adjacent ends of two separate slats simultaneously or in sequence.

The shaping device may be selectable from devices for different shapes.

The shaping device can be arranged to follow a contoured path to product shapes including radiused corners to said ends, and/or bevelled edges.

The apparatus may include one or more laddering stations positioned for receiving the cut and punched slats.

Each said laddering stations may have relatively adjustable side members for selectively setting slat width.

The laddering stations may also have a mechanism for alternating the amplitude of movement of a string oscillating device as the width setting is change. The string oscillating device provides a zig-zag shaped ladder for the slats. The mechanism may comprise a tapered element acting as a stop for either direction of movement to limit the travel according to that required for each width.

The apparatus may have a controller for controlling operations of any of the stations.

The controller may be set for controlling the drive means to feed the strip material a preset length from a plurality of settable lengths. It may also be set to control the slot positions.

The controller settings may be preprogrammed and can then be selected to simply selecting the program for the settings. The programs are preferably bar coded and a bar code reader is used to select the desired program.

The controller may also be set to produce a fixed member of slats.

The controller may also be set to control one or more of the operations.

The strip material may be wood, plastic, metal including aluminium.

Strip materials with widths from 10 to 100 mm can be accommodated by the apparatus.

In order that the present invention can be more readily understood and be put into practical effect the description will now be described with reference to the accompanying drawings which illustrate non-limiting embodiments of the present invention, and wherein:

DETAILED DESCRIPTION OF THE INVENTION

Figures 1, 2, 3, 4:
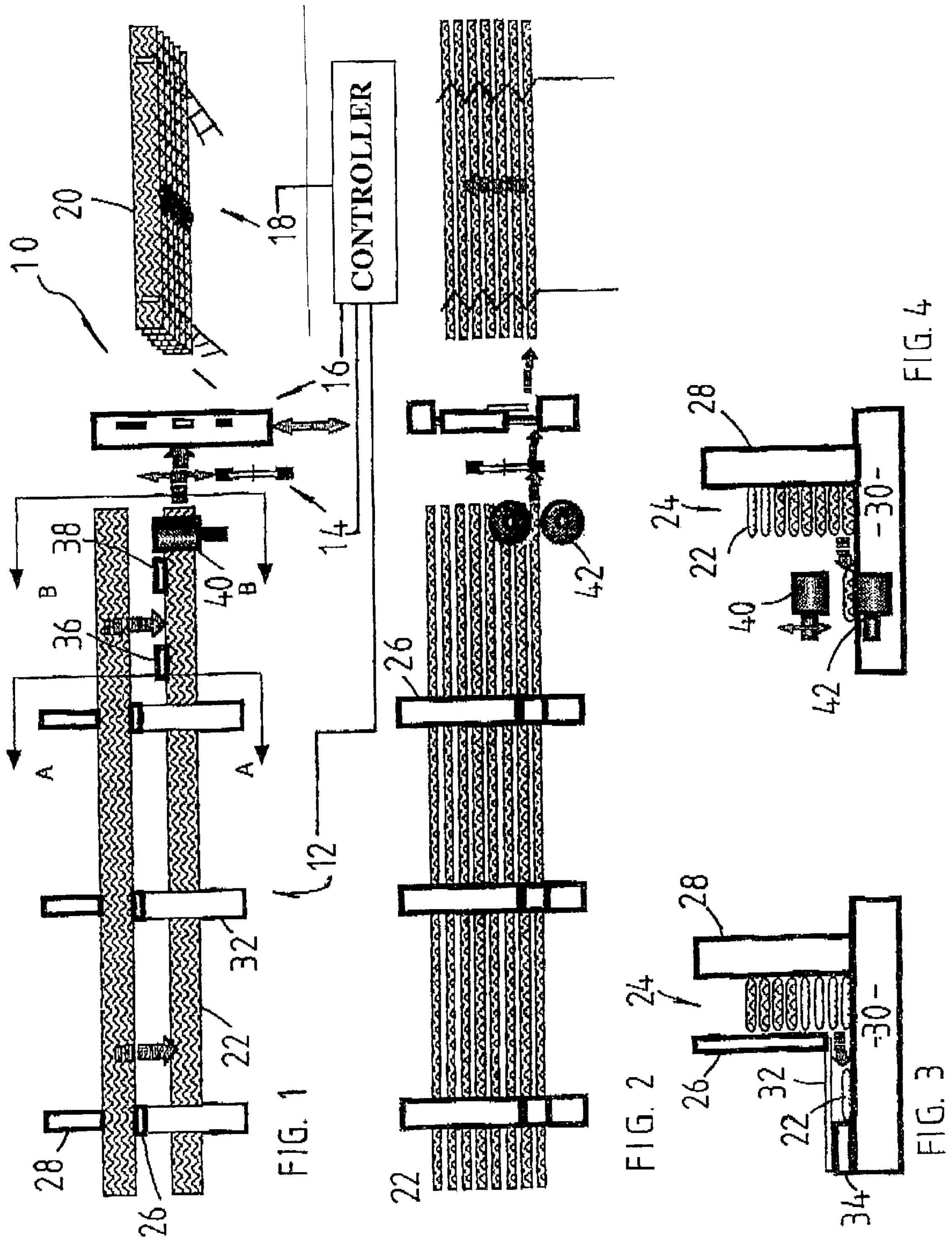
FIG. 1 is a schematic diagram of a plan view of the apparatus for manufacturing wood venetian blinds according to the present invention.
FIG. 2 is a side view of the apparatus shown in FIG. 1.
FIG. 3 is an end cross-section view at A—A of the apparatus shown in FIG. 1.
FIG. 4 is an end cross-section view along B—B of the apparatus shown in FIG. 1.

Referring initially to FIG. 1 there is shown a plan schematic view of the apparatus 10 for manufacturing timber venetian blinds according to the present invention.

The apparatus 10 as shown comprises a feeding station 12, a sawing station 14, a punching station 16 and a laddering station 18 where slats 20 cut from timber strips 22 are assembled into a venetian blind.

The feeding station 12 has a magazine section 24 which is shown more clearly in FIGS. 3 and 4. As can be seen a stack of timber strips 22 for cutting into the slats 28 of preset lengths is stored in the section 24.

The section 24 has a number (three in this embodiment) of paired arms 26, 28. The arms 28 are linked and are adjustably movable in unison relative to the arms 26 for accommodating timber strips 22 of various widths in the magazine section 24. Typically the space between the arms 26 and 28 can be adjusted to accommodate strips 22 with 10 to 100 mm width.

The feeding station 12 has a base or track 30 adjacent to one side of which the magazine section 24 is positioned. Each of the arms 26 is spaced from the base or track 30 by a plate 32 which is fixed to a block 34 arranged on the base or track 30. As shown in FIG. 3 this arrangement provides a gap under each arm 26 for receiving a timber strip 22 fed from the bottom of the stack in the magazine 24. The block 23 and the plate 32 cooperate to confine the strip 22 within the gaps.

Returning to FIG. 1, a controllably moveable element (not shown) is employed to push the bottom strip 22 in the magazine section 24 in the gap when the apparatus 10 is in operation.

A pair of driving rollers 40, 42 are located in close proximity to the sawing station 14 for maximising the number of slats 20 that can be cut from the timber strips 22. The roller 42 is in this case is a feed roller.

As shown in FIG. 4 the roller 40 is controllably movable in a certain direction. The roller 40 is controlled to move away from the roller 22 when a timber strip is to be delivered in to the gaps.

When the timber strip 22 within the gaps are to be fed for a subsequent operation the roller 40 is controlled to move towards the roller 42 and the roller 40 is then driven to feed the timber strip 22 towards the sawing station 14 (See FIG. 2).

In this embodiment the roller 40 is a rotary encoder serving as a measuring device for providing feedback signals to a controller which controls operations of the apparatus 10. By using the feedback signals the controller can accurately position the strip 22 for sawing the strip 22 into preset lengths and punching slots.

Figure 5A:
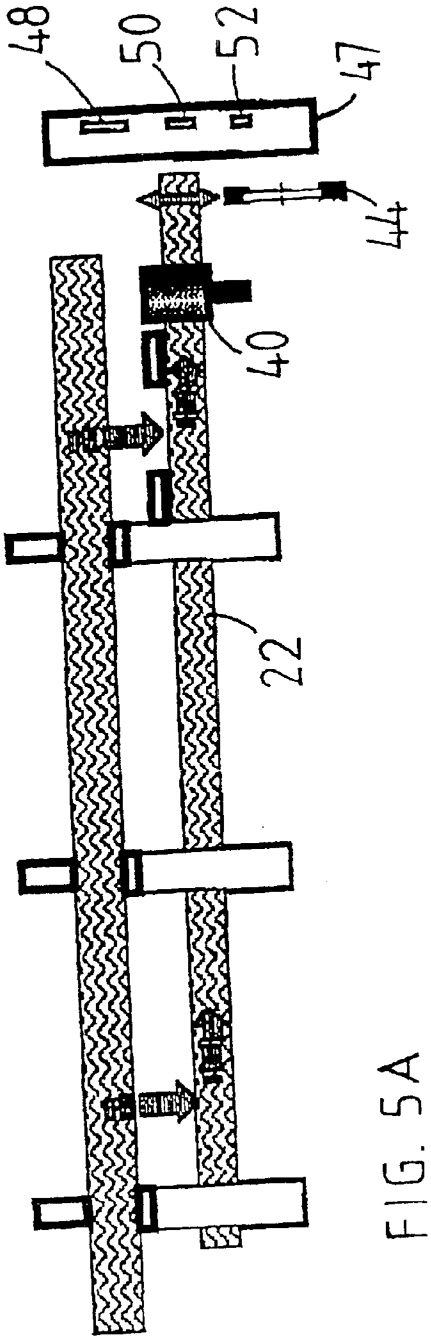
FIGS. 5A to 5D are schematic diagrams showing operational steps of the apparatus of FIG. 1 from feeding a strip of wood for cutting to slat lengths to positioning a cut and punched slat for laddering.

FIG. 5A shows that the strip 22 is driven by the rollers 40, 42 a small distance past a saw 44 in the sawing station 14 for trimming one end thereof. The saw 44 is controlled to reciprocate in the direction shown by the double ended arrow for sawing and retracting from the strip 22.

The trimmed end piece then drops in the collection bin (not shown) as illustrated in FIG. 5. The strip 22 is again fed into positions (2 in this embodiment) for punching slots 46 by a selected one of the punches 48, 50, 52 fixed to a punch head 47 which is controllably movable between an up position for allowing the strip 22 to more through the punching station 16 and a down position for punching a slot 46.

The punch head 47 is adjustably movable to position one of the punches 48, 50, 52 for the punching operation. An indexed shaft is used to more the head 47 and is colour coded for the positions of the punch heads so that a user simply moves to lock the shaft into the colour coded index for the punch (48, 50 or 52) to the used.

Figure 5B:
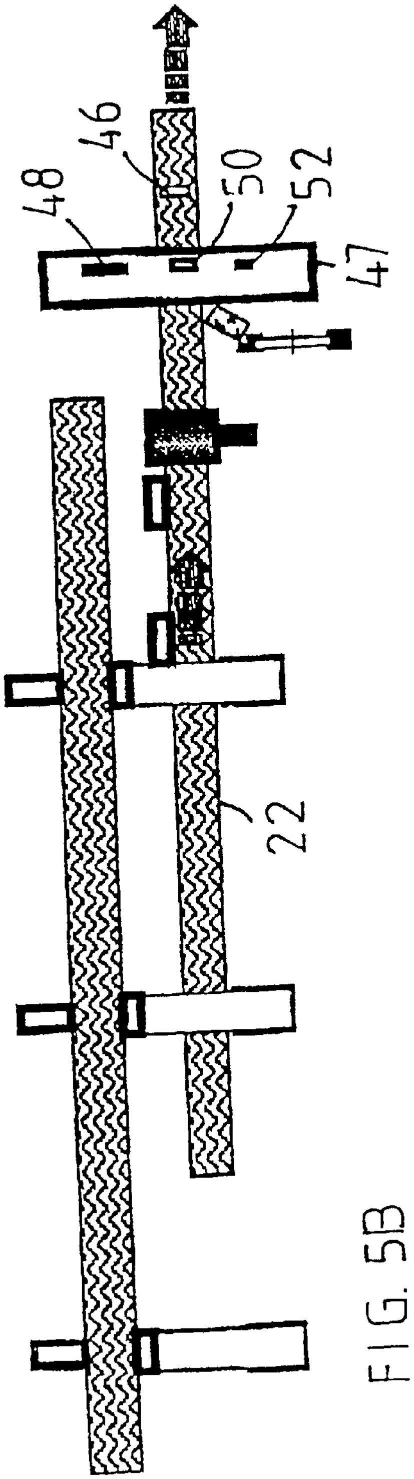
Figure 5C:
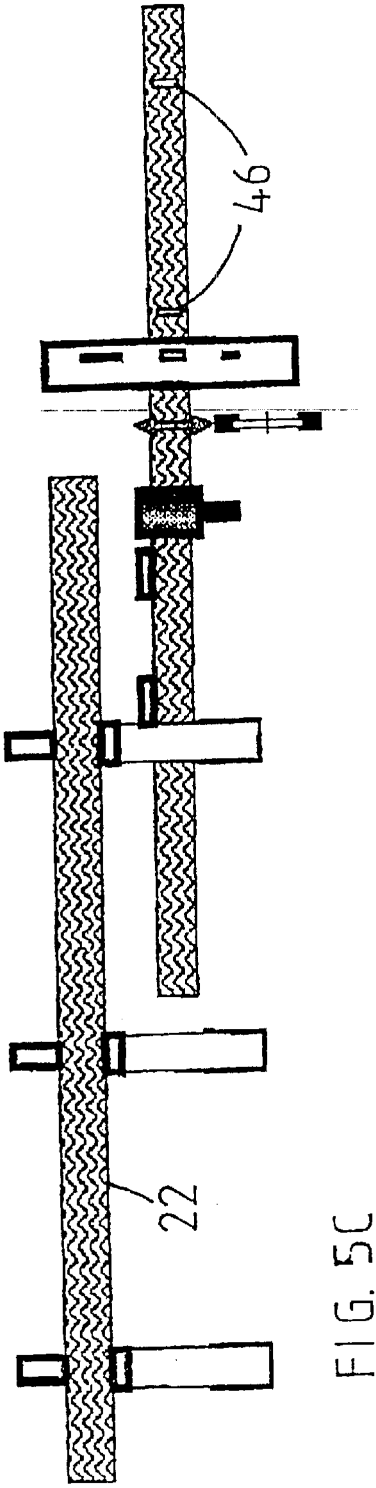
Figure 5D:
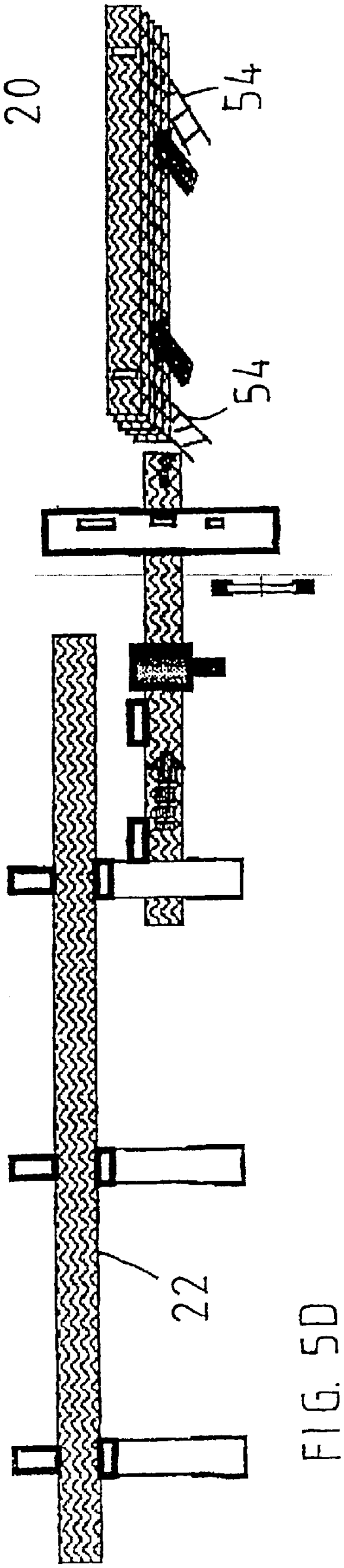

After the second slot 46 is punched the strip 2 is controlled to move to a position as shown in FIG. 5C to be sewn into a slat 20 of the preset length.

The strip 22 is fed to positions for the operations as shown in FIGS. 5A to 5C except for the initial end trimming operation. At the same time the slat 20 previously cut is pushed by the strip 20 in between rungs of a pair of ladders 54 of the blind to be assembled in the laddering station 18.

As strips 22 are not usually of equal length and the cut slats 20 are not usually multiples of the strips 22 there are remnants having a length shorter than the slat length. These remnants must be cleared from the feeding path of the strips 22 if full automation of venetian blind manufacturing is to be realised.

Figure 6A:
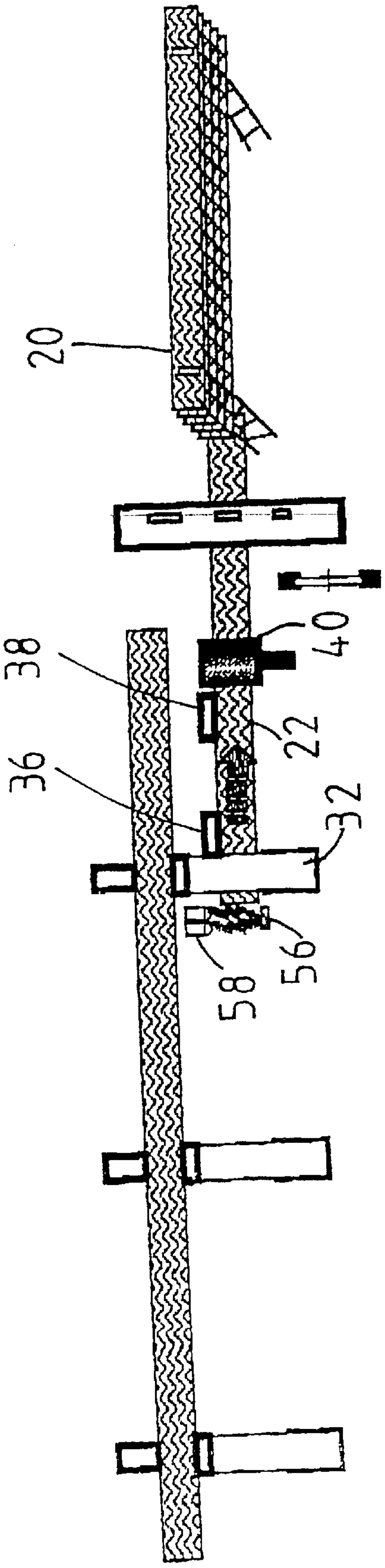
FIGS. 6A to 6D are schematic diagrams showing stages in a remnant ejection process of the apparatus of FIG. 1.

FIGS. 6A to 6D show an example of how the remnants are ejected from the feeding path. Turning to FIG. 6A there is shown a sensor means having a light emitting device 56 and a light receiving detector 58 positioned on opposite sides of the strip 22 when placed in the gaps. The detector 58 is arranged to produce an output signal when it detects the light from the device 56.

In operation when the far end of the strip 22 moves past the device 56 as shown in FIG. 6A the strip 22 is now shorter than the length of the slats 20 and the detector 58 sends a signal to the controller to begin an ejection operation.

If any part of the strip 22 is under the plate 32 close to the roller 40 the roller 42 is controlled to feed the strip 22 forward to clear the plate 32.

Figure 6B:
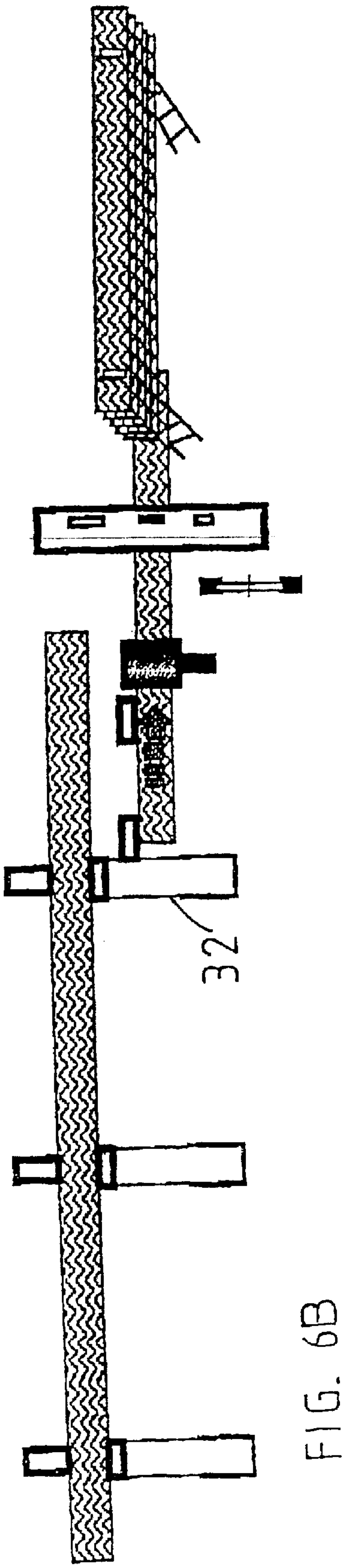
Figure 6C:
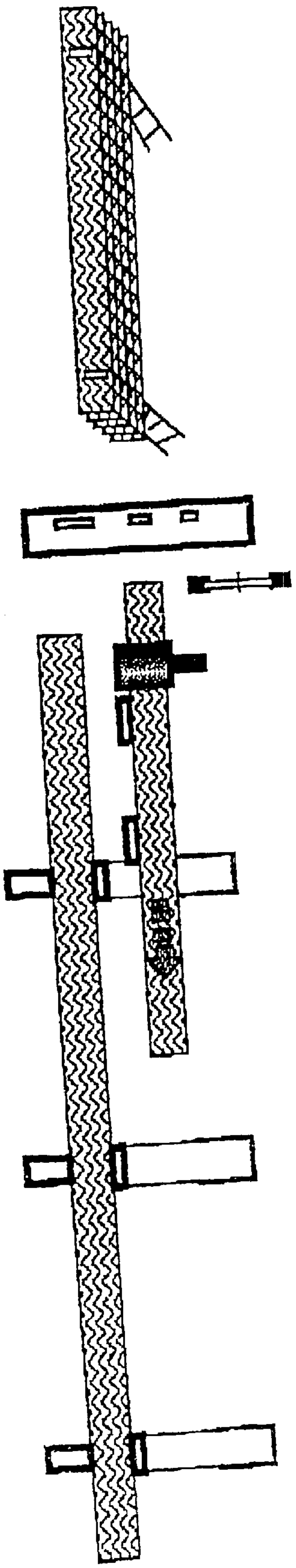
Figure 6D:
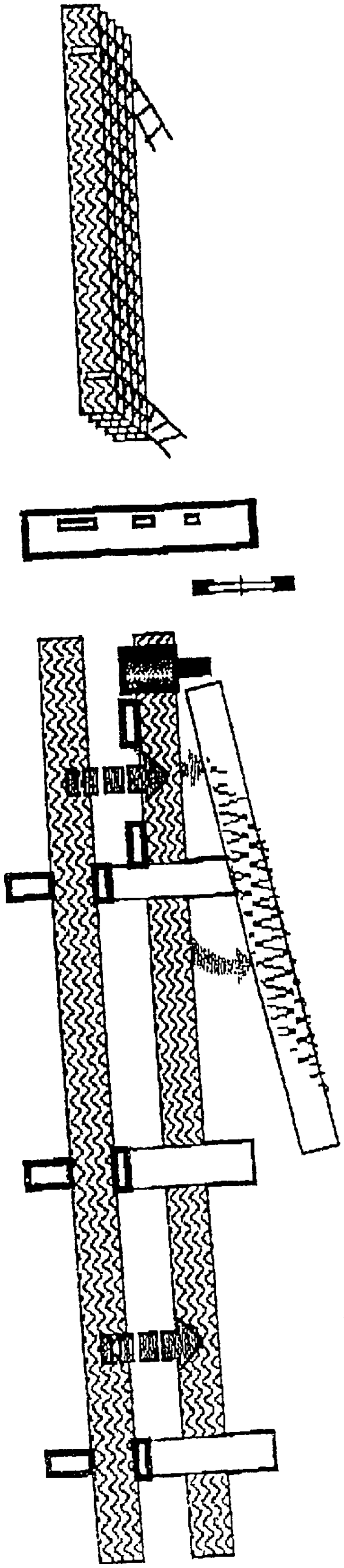

When the far end of the strip 22 is positioned past the block 32 as shown in FIG. 6B, lifting elements 36 and 38 are operated to lift the strip 22 and the feed roller 42 is controlled to reverse the feed direction. The strip 22 now rests on the plate 32 waiting for a following strip 22 from the magazine section 24 to move in a direction toward the gap. At the same time the strip 22 is lifted to rest on the plate 32 as shown in FIG. 6D.

Figure 7:
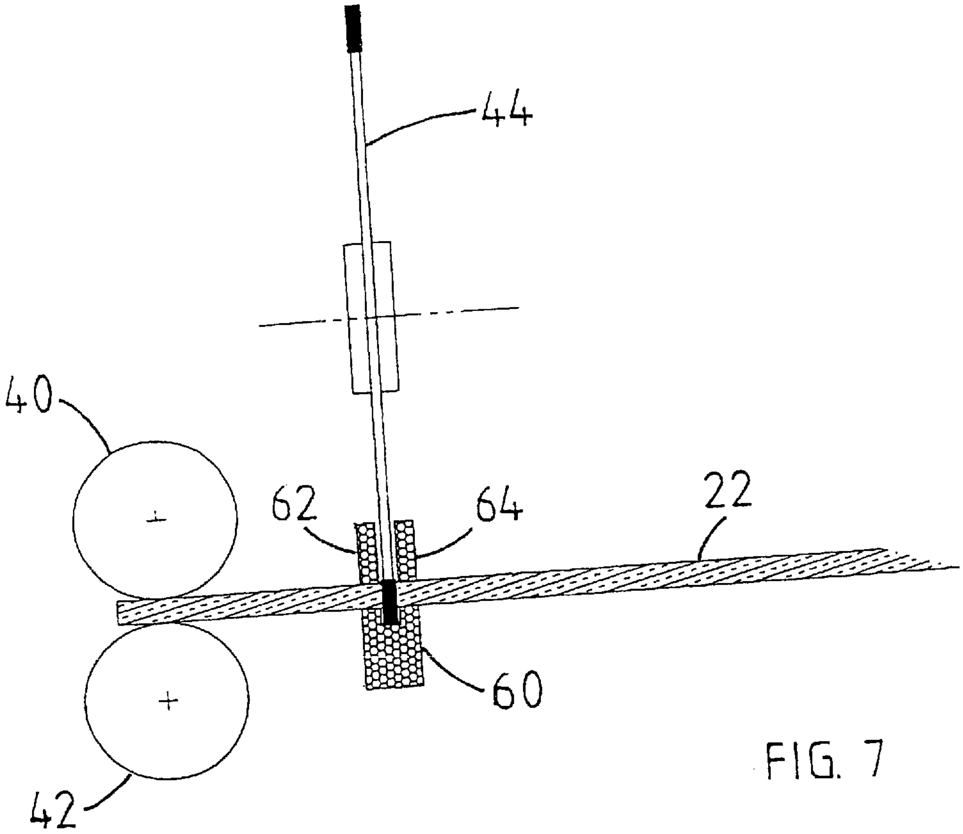
FIG. 7 is a schematic diagram showing a partial cross sectional side view of the cutting station of the apparatus of FIG. 1.
Figure 8:
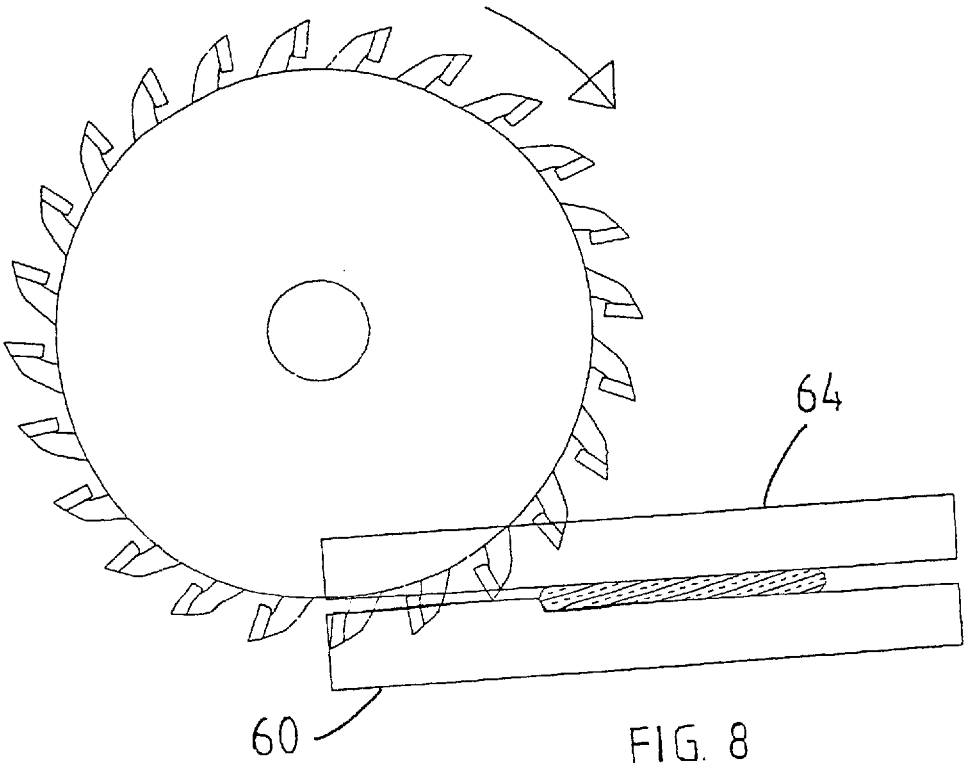
FIG. 8 is a schematic diagram showing a partial cross sectional end view of the cutting station of the apparatus of FIG. 1.

FIGS. 7 and 8 show in some detail the arrangement of the saw 44 and its anvil 60 at the saw station 14. The strip 22 to be cut is clamped by a pair of clamps 62,64 arranged on opposite sides of the saw 44. Both the anvil 60 and the clamps 62,64 are made of vibration damping material including rubber compound. This reduces vibration when the strip 22 is being sawn. The damping material also reduces noise.

Figure 9:
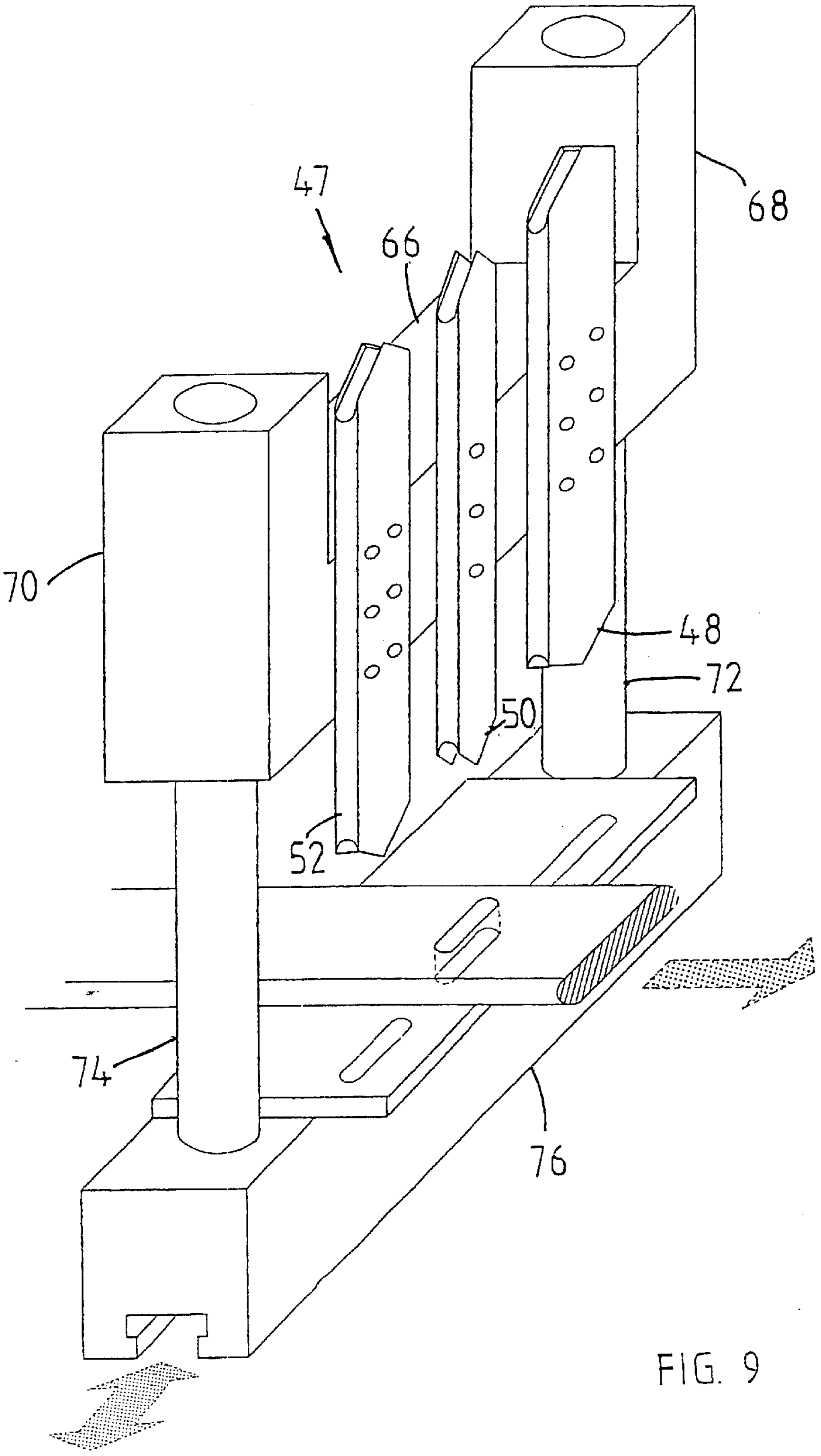
FIG. 9 is a schematic diagram showing a partial perspective view of the punching station of the apparatus of FIG. 1.

FIG. 9 shows in detail the punch head 47 and the punches 48, 50, 52 described earlier with reference to FIGS. 5A to 5D.

The head 47 has a cross arm 66 and the two side arms 68,70. All of the punches 48 to 52 are fixed on the cross arm 66. Each said side arms 68,70 have an aperture movably positionable along rods 72, 74. The rods 72,74 are fixed to a beam 76 having slots 78,80,82 shaped to receive the punches 48 to 52.

Figures 10A, 10B, 10C:
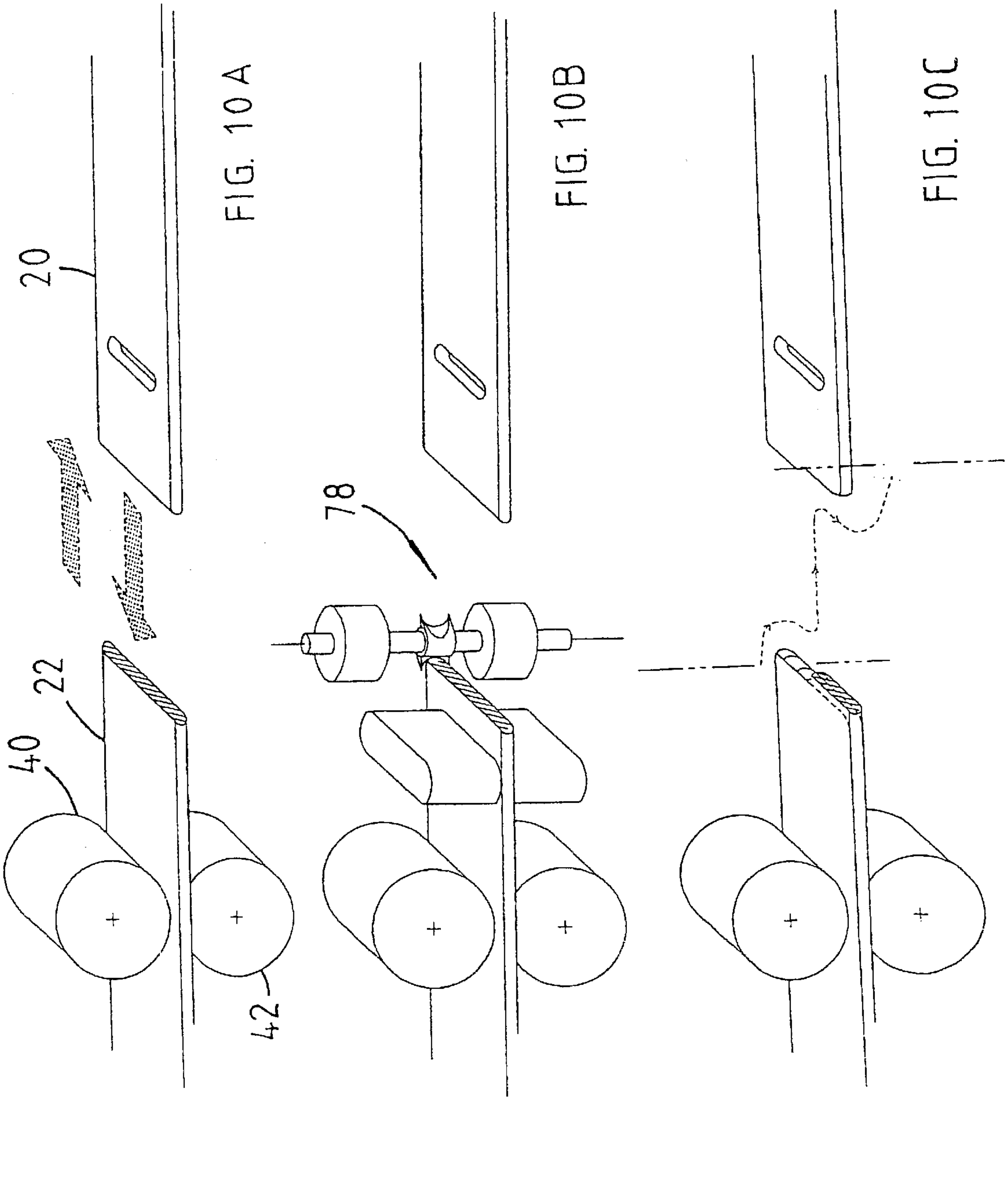
FIGS. 10A to 10C are schematic diagrams showing steps in a shaping station for the apparatus of FIG. 1.

FIGS. 10A to 10C show arrangement of a shaping station that can be positioned between the cutting station 14 and the punching station 16.

Referring to FIG. 10A, after sawing through the strip 22 the roller 42 is reversed to an extent to allow a shaping tool to controllably movable between adjacent ends of the slat 20 and the strip 22. The shaping tool 78 is adapted to round corners at the ends of the strip 22 and the slot. The shaping may also be arranged to bevel the top and bottom of the ends. Whereby the ends of the slats 20 can be contoured to a predetermined shape.

What is claimed is:

1. An apparatus for manufacturing slats of blinds comprising a feeding station for feeding a strip stock material with a stock length, a cutting station positioned downstream of the feeding station, the feeding station being adapted to feed the strip stock material downstream into the cutting station for cutting into one or more slats of a preset length, and a punching station positioned downstream of the cutting station for punching one or more apertures in said one or more slats; and the feeding station including means for ejecting from the feeding station the strip stock material when the stock length of the strip material or a length of a remnant of the cut strip stock material is shorter than said preset length.

2. The apparatus according to claim 1 wherein the feeding station includes a receiving section for receiving the strip stock material to be cut and controllable drive means arranged for feeding the strip stock material downstream into the cutting station when the stock length is the same as or greater than the preset length.

3. The apparatus according to claim 2 wherein the drive means is positioned adjacent to the cutting station.

4. The apparatus according to claim 2 wherein the drive means is reversible and is controlled to drive the strip stock material for ejection or the remnant upstream into the receiving section for ejection.

5. The apparatus according to claim 2 wherein the feeding station includes a magazine section in which a plurality of strip stock materials are stored and an inserting means for controllably inserting into said receiving section one of the plurality of strip stock materials in the magazine section as said strip stock material.

6. The apparatus according to claim 5 wherein the feeding station includes an adjustable guide arrangement for guiding the plurality of strip materials in said magazine section and the guide arrangement is adapted to be adjustable for different widths of the strip stock materials.

7. The apparatus according to claim 1 wherein the apparatus has a collection section for collecting any of the ejected strip stock material and the remnants.

8. The apparatus according to claim 1 wherein the ejection means includes a sensing device arranged to produce an ejection signal when the strip stock material or remnant is shorter than the preset length.

9. The apparatus according to claim 8 wherein said sensing device is an optical detector arranged so that it receives an optical signal when the strip stock material or the remnant is shorter than said preset length.

10. The apparatus according to claim 1 wherein the cutting station includes a cutting device positioned proximate to the feeding station so that a maximum number of slats with the preset length can be cut from the strip stock material.

11. The apparatus according to claim 1 wherein a vibration damping arrangement is provided for reducing vibrations when cutting.

12. The apparatus according to claim 1 wherein the punching station has a punch head with at least one punch controllably movable for punching apertures in the strip stock material.

13. The apparatus according to claim 1 wherein the apparatus further comprises a shaping station positioned between the cutting station and the punching station and having a shaping device arranged for shaping one or more cut ends of the strip stock material.

14. The apparatus according to claim 13 wherein the shaping device is arranged to follow a contoured path to produce shapes including radiused corners and/or beveled edges to said one or more cut ends.

15. The apparatus according to claim 1 wherein the apparatus includes one or more laddering stations positioned for receiving the cut and punched slats.

16. The apparatus according to claim 1 wherein the apparatus has a controller for controlling operations of any of the stations.

17. The apparatus according to claim 16 wherein the controller is adjustable for setting the preset length, and is arranged for controlling drive means to feed the strip stock material to a distance equalling the preset length.

* * * * *